United States Patent
Pfleger et al.

(10) Patent No.: US 8,354,771 B2
(45) Date of Patent: Jan. 15, 2013

(54) INTERPOLE ASSEMBLY FOR ROTARY ELECTRICAL MACHINE

(75) Inventors: Alexandre Pfleger, Weyer (FR); Olivier Gas, Paris (FR); Jean-Claude Mipo, Creteil (FR); Lilya Bouarroudj, Paris (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 181 days.

(21) Appl. No.: 12/663,465

(22) PCT Filed: Apr. 22, 2008

(86) PCT No.: PCT/FR2008/050723
§ 371 (c)(1),
(2), (4) Date: Jun. 18, 2010

(87) PCT Pub. No.: WO2009/000981
PCT Pub. Date: Dec. 31, 2008

(65) Prior Publication Data
US 2010/0289371 A1 Nov. 18, 2010

(30) Foreign Application Priority Data
Jun. 27, 2007 (FR) ...................................... 07 56058

(51) Int. Cl.
*H02K 1/22* (2006.01)
(52) U.S. Cl. ...................................................... 310/263
(58) Field of Classification Search .................. 310/263, 310/181
See application file for complete search history.

(56) References Cited

U.S. PATENT DOCUMENTS

| 6,930,432 | B2 * | 8/2005 | Maeda et al. | 310/263 |
| 7,057,327 | B2 * | 6/2006 | Kanazawa et al. | 310/263 |
| 7,642,691 | B2 * | 1/2010 | Morita et al. | 310/263 |
| 2004/0032183 | A1 | 2/2004 | Nakamura et al. | |

FOREIGN PATENT DOCUMENTS

| EP | 0 991 162 A1 | 4/2000 |
| EP | 1 643 615 A1 | 4/2006 |
| FR | 2 793 085 A1 | 11/2000 |
| FR | 2 798 786 A1 | 3/2001 |

* cited by examiner

*Primary Examiner* — Dang Le
(74) *Attorney, Agent, or Firm* — Berenato & White, LLC

(57) ABSTRACT

A rotor (1) for a rotary electrical machine, which includes two pole wheels (2) having a series of axial claw poles (20) of a trapezoidal overall shape which extend axially from the extreme radial outer edge of the pole wheel (2a) toward the other pole wheel (2b), such that each pole claw (20a, 20b) of a pole wheel (2a, 2b) is situated in the space which exists between two consecutive claw poles (20a) of the other pole wheel (2b). The rotor (1) includes magnetic assemblies (3) in the interpole space (22). An assembly (3) is composed of at least one magnetic member (31) and at least one magnet (30), received in a groove (21) made in each of the facing edge faces of the two adjacent claw poles (20a, 20b). This has the advantage of increasing the cross-section for the flow of rotor flux towards the stator, and of enabling the same milling cutter as has already been used to make the grooves in the edge faces of the claw poles.

17 Claims, 5 Drawing Sheets

INTERPOLE ASSEMBLY FOR ROTARY ELECTRICAL MACHINE

FIELD OF THE INVENTION

The present invention relates in general to rotary electrical machines.

To be more exact, the invention relates to rotary machines of the alternator or alternator-starter type which are employed in motor vehicles.

To be even more exact, the invention relates to rotary machines whose rotor comprises magnets, such for example as permanent magnets such as rare-earth magnets, and one or more excitation windings.

BACKGROUND OF THE INVENTION

The rotor has a claw pole structure comprising magnetised parts, and an annular excitation winding which is positioned around the rotating shaft of the machine. The rotor is formed by two pole wheels which each comprise claw poles each of which is inserted between two claw poles of the opposite pole wheel.

The magnets which are arranged between two claw poles serve to prevent the leakage of magnetic flux between the magnetic poles in claw form. The magnets may be positioned between each pair of claw poles or between only certain pairs of claw poles.

The magnets are positioned between the claw poles of each pole wheel either by clips or by means of two grooves which are made in individual lateral edges of the claw poles between which the magnet is situated.

In the first case the magnets have a tendency to move as a result of centrifugal force because the clips do not ensure that they are fixed in place in the optimum way.

In the second case the magnets have to fill the whole of the interpole space, which increases the cost of the machine because these magnets are expensive.

The object of the invention is to propose a rotor having interpole magnets which are both reduced in size and fixed in place in the lateral grooves in the claw poles, i.e. by using the grooves which are made as a normal practice by a standard milling operation and hence without changing the usual process by which the magnet-equipped rotor is produced.

SUMMARY OF THE INVENTION

The rotor according to the invention is a rotor for a rotary electrical machine, which comprises two pole wheels comprising a series of axial claw poles of a trapezoidal overall shape which extend axially from the extreme radial outer edge of the said pole wheel towards the other pole wheel, such that each claw pole of a pole wheel is situated in the space which exists between two consecutive claw poles of the other pole wheel, and that at least one interpole space comprises a magnetic assembly; it is characterized in that at least one of the assemblies is composed of both at least one member made of a magnetic material which is all in one piece, such for example as a material identical to that of the poles, and at least one magnet, part of which assembly is received in a groove made in each of the facing edge faces of the said two adjacent claw poles. This has the advantage of increasing the cross-section for the flow of rotor flux towards the stator, but also of enabling the same milling cutter, and hence the same production process, to be used as has already been used to make the grooves in the edge faces of the claw poles and to insert the conventional magnets. The member made of magnetic material fills the space between the magnet and the groove because it replaces part of the prior art magnet so that the volume of the assembly formed by the magnet and the member made of magnetic material is equal to that of the prior art magnet and thus fills the space between the interpole grooves. The magnetic member may also be referred to as a packing piece.

In accordance with a particular feature, the width of the magnet is between 18 and 22 times the size of the air gap. Hence, for an air gap space of for example 0.325 mm, the width of the magnet will need to be between 5.85 and 6.5 mm. The air gap is the distance between the rotor and the stator.

The width of the magnet is preferably 20 times the air gap. For an air gap of 0.325 mm that means a width of 6.5 mm.

In accordance with another feature, the material of the magnetic member is steel. The steel is preferably mild steel which conducts the flux in the magnetic members better. The poles too may be made of steel.

In accordance with another feature, the magnet is made of rare earth material, such as NeFeB magnets, or is of the ferrite type.

In a first variant, the magnet is positioned centrally between the two claws which form the two poles. The central position of the magnet in the magnetic assembly makes it possible to have an assembly which is more balanced magnetically.

In a second variant, the magnet is positioned against one of the claws which form the poles. This enables interpole leakage to be counteracted, the polarity of the magnet being determined as a function of the polarity of the adjacent poles.

In a third variant, there are two magnets. They may thus be distributed symmetrically in the interpole space.

In a first embodiment, the magnetic member has a T-shaped outline. In this case the magnet is made up of two identical portions of a substantially rectangular shape which are positioned on either side of the shank of the T. The magnet is held in place against the magnetic member by its magnetisation. It is possible for a packing piece to be added if necessary in a known manner.

In a second embodiment, the magnetic member has a U-shaped outline. In this case the magnet is positioned between the two sides of the U. The magnet is held in place against the magnetic member by its magnetisation. It is possible for a packing piece to be added if necessary in a known manner.

In a third embodiment, the magnetic member has an S-shaped outline. The magnet is made up of two portions which are cut in such a way that they fill the two sides of the S. The magnet is held in place against the magnetic member by its magnetisation. It is possible for a packing piece to be added if necessary in a known manner.

In a fourth embodiment, the magnetic member has a π-shaped outline. The π-shaped member is produced is such a way that its legs are slightly splayed and the base of each leg is narrower or has a slight crank so that the legs can move apart or together to give a spring action. The magnet is made up of two identical portions which are positioned on either side of the two legs of the π.

In a fifth embodiment, the magnetic member has an H-shaped outline. In this case the principle is the same as for the T-shape except that in this case there is a second cross-stroke at the bottom of the T.

In all the above cases, the member in the shape of a T, U, S, π or H may be produced by extrusion.

In a fifth embodiment, the magnetic member is produced from sheet material which is folded into an accordion shape. The member is thus made from a flat sheet which is then folded into an accordion shape and it thus has a certain elasticity which enables the deformations of the claw poles to be absorbed and hence the mechanical stresses in the magnetic members to be reduced.

In accordance with a particular feature, the magnetic member has lateral perforations. These perforations assist the flow of the varnish between the claw poles and the bonding together of the assembly.

In accordance with another feature, the upper surface which is intended to be positioned towards the outside of the rotor is serrated. These serrations improve the efficiency of the alternator by reducing the losses due to eddy currents which occur on the surface of the claw poles.

In accordance with a particular feature, one of the ends of the upper surface has at least two rounded edges. This shape makes it easier for the interpole assembly to be inserted automatically in the production process. The edges may equally well be bevelled.

The rotor according to the invention is used in an alternator or an alternator-starter.

It is possible, in a symmetrical way, for the magnetic members and the magnets to swap roles, i.e. for use to be made for example of a T-shaped magnet and of members made of an identical material to the poles on either side of the shank of the T. In the same way, the configuration of the magnetic assembly may be designed to have the member in the shape of a T or U or S arranged horizontally or vertically.

BRIEF DESCRIPTION OF THE DRAWINGS

The invention will be better understood from perusal of the following description, which is given solely by way of example and which refers to the accompanying drawings, in which.

DETAILED DESCRIPTION

Figure 1:
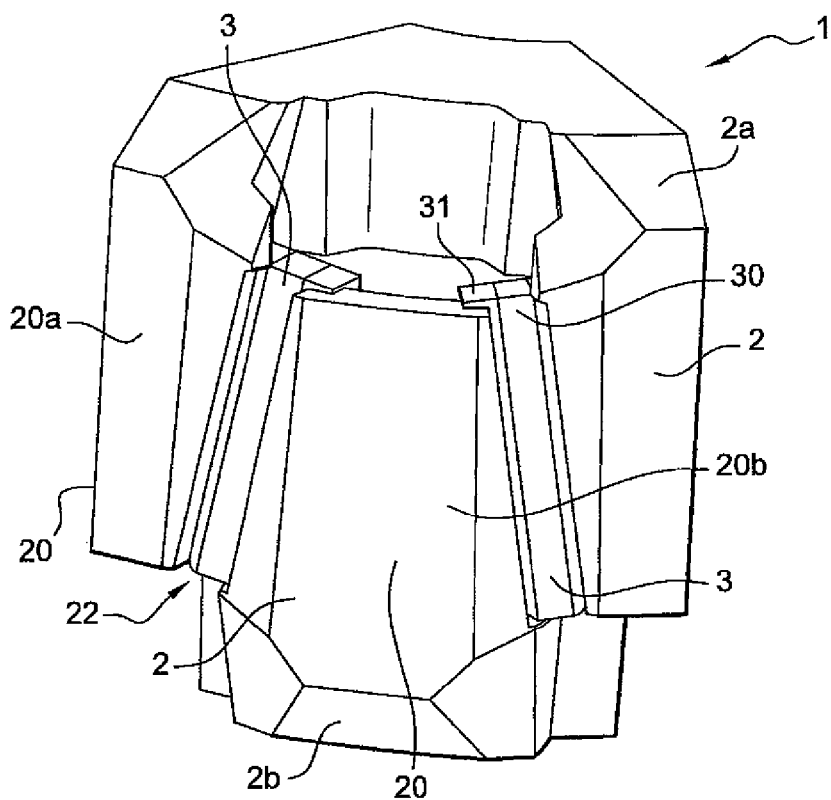
FIG. 1 is a perspective view of a rotor according to the invention in which part of the upper pole wheel has been removed for greater clarity.

The rotor 1 shown in FIG. 1 is made up of two pole wheels 2 each of which has a plurality of claw poles 20. The upper pole wheel 2a comprises claw poles 20a and the lower pole wheel 2b comprises claw poles 20b, if the top of FIG. 1 is taken as defining "upper" and the bottom of the Figure as defining "lower". A magnetic assembly 3, comprising a magnet 30 and a magnetic member 31 which may be of the same material as the pole wheels 2, is positioned between two claw poles, namely 20a (at the top) and 20b (at the bottom).

Figure 2:
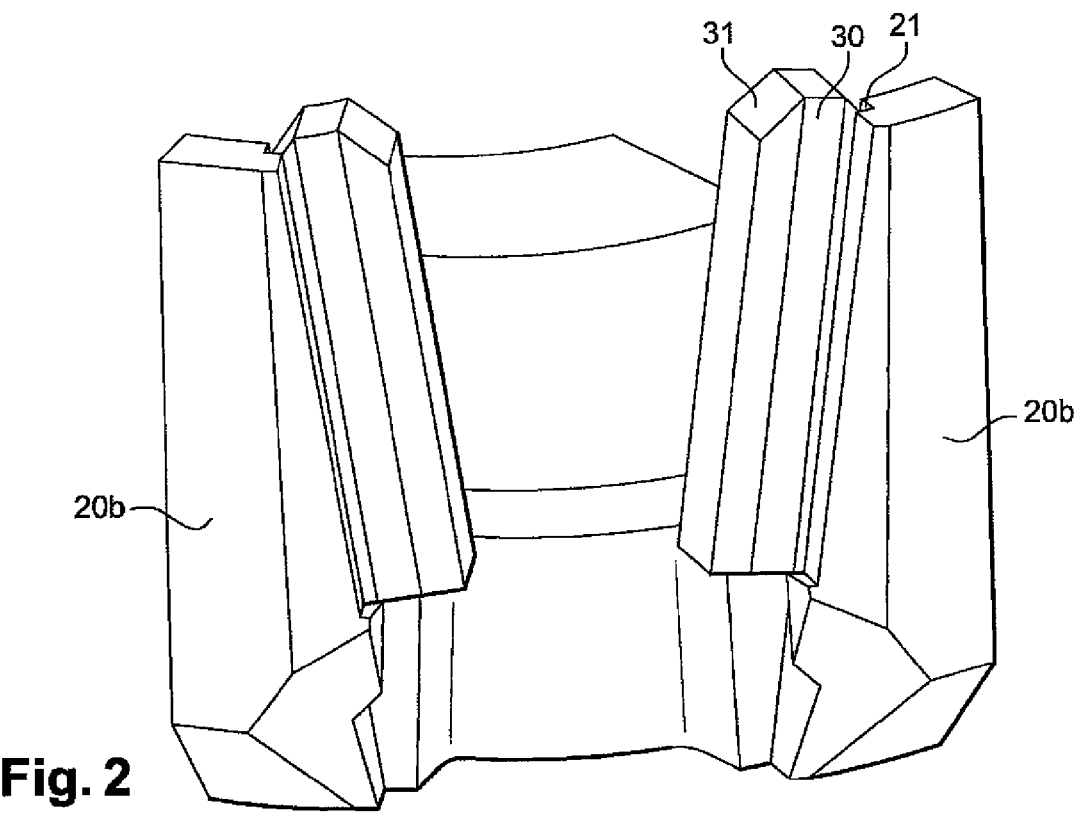
FIG. 2 is a perspective view of a pole wheel having a pair of assemblies according to the invention.

Grooves 21 are made in the sides of those claw poles 20a and 20b between which the magnetic assembly 3 is situated, as can be seen from FIG. 2.

The grooves 21 are made in the conventional way using a milling cutter whose head is for example 9.5 mm wide for an air gap of 0.325 mm. In the example shown in FIGS. 1 and 2, the width required for the groove 30 is then 6.5 mm and the difference is thus made up by two 1.5 mm magnetic members 31.

Figure 3:
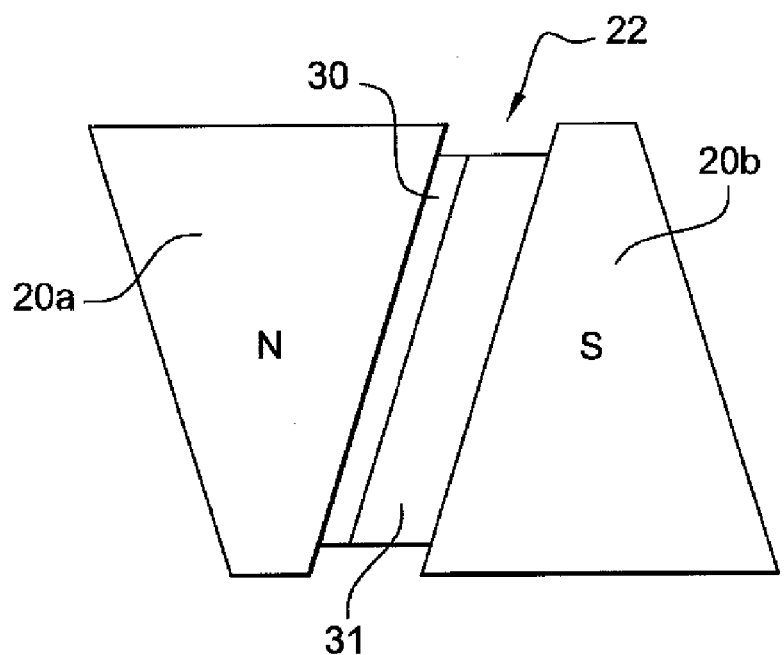
FIG. 3 is a view from the side of a first embodiment of rotor.
Figure 4:
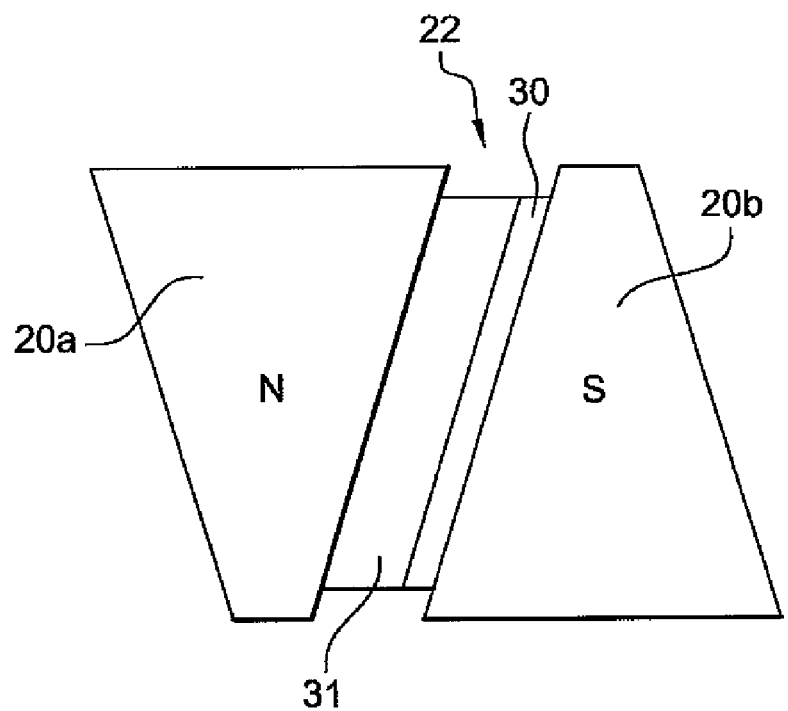
FIG. 4 is a view from the side of a second embodiment of rotor.

As can be seen from FIGS. 3 and 4, it is also possible for there to be only a single magnet 30 and a single magnetic member 31, and in this case the magnet 30 is positioned against the claw pole 20a (which is a north pole in the present case) of the upper pole wheel 2a and the magnetic member 31 is positioned against the claw pole 20b (which is a south pole in the present case) of the lower pole wheel 2b (see FIG. 3). In FIG. 4 on the other hand the magnet 30 is positioned against the claw pole 20b (which is a south pole in the present case) of the lower pole wheel 2b and the magnetic member 31 is positioned against the claw pole 20a (which is a north pole in the present case) of the upper pole wheel 2a.

Figure 5:
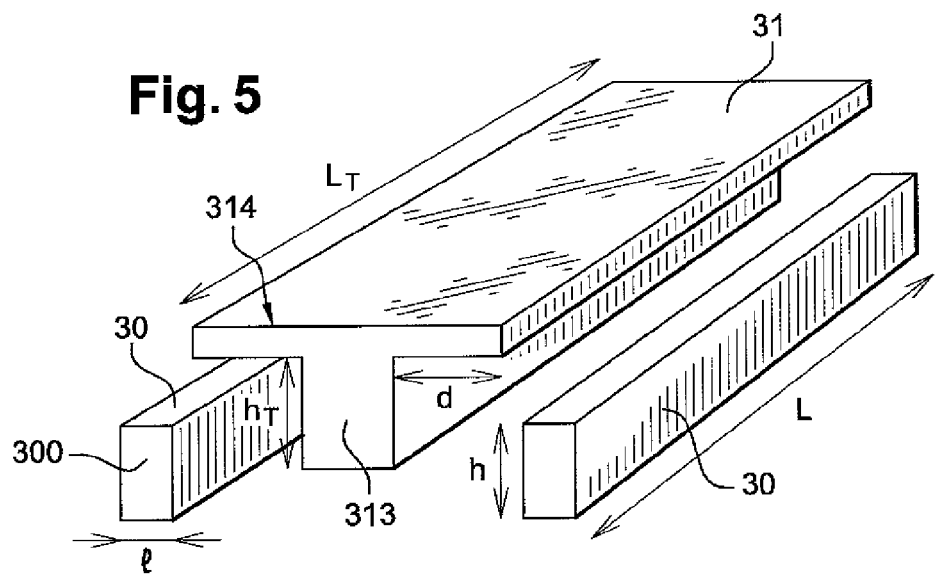
FIG. 5 is a perspective view of a first variant of the magnetic assembly.
Figure 6:
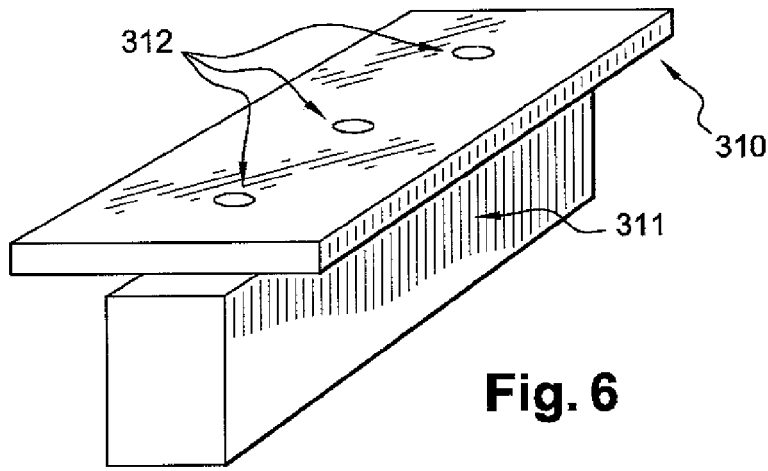
FIG. 6 is a perspective view of the way in which the magnetic member shown in FIG. 5 is fitted together.

In the embodiment of magnetic member 31 which is shown in FIG. 5, the outline of the magnetic member 31 is in the shape of a T. This T is produced from a sheet 310 of magnetic material and a bar 311 of the same material which is, for example, of square or rectangular cross-section, which items are welded together by spot welds 312 (FIG. 6). These parts 310 and 311 may equally well be given a continuous weld by laser or by resistance or by another other suitable means.

The magnets 30 which are shown in FIG. 5 have portions 300 of which the width I is equal to the distance d between the shank 313 of the T-shaped magnetic member 31 and the end of the cross-stroke 314 of the T, such that each portion 300 does not project beyond the T. The length L of the portions is substantially equal to the length $L_T$ of the T-shaped member. The height h of each portion 300 is equal to the height $h_T$ of the shank of the T. The magnetic assembly 3 is thus of a uniform appearance with substantially flat faces. The magnets 30 and the T-shaped magnetic members 31 are held together either by magnetisation, or by adhesive bonding if the magnets 30 are not magnetised. The magnets 30 are held in place in the interpole zone by the grooves 21, and by the T-shaped magnetic member 31 by the ends of the cross-strokes 314 of the T.

Figure 7:
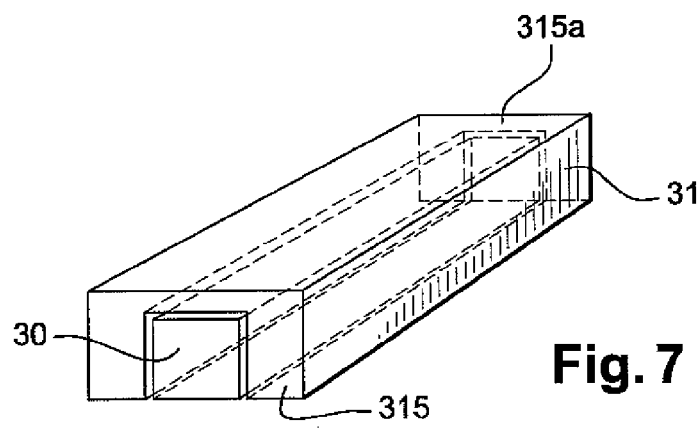
FIG. 7 is a perspective view of a second variant of the magnetic assembly.

In the variant which is shown in FIG. 7, the outline of the magnetic member 31 is U-shaped and the magnet 30 is positioned between the two sides 315 of the U and the bottom 315a of the U; its size is such that it does not project beyond the said sides 315 of the U and the magnetic assembly 3 thus has a substantially flat surface.

Figure 8:
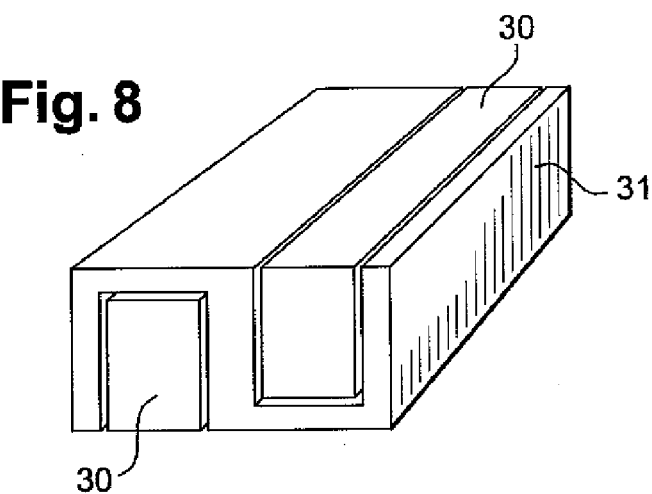
FIG. 8 is a perspective view of a third version of the magnetic assembly.

FIG. 8 shows a third embodiment of magnetic member 31 which is S-shaped. The magnets 30 are positioned in each of the loops of the S. The magnets 30 are of a length substantially identical to the length of the S-shaped member and the outline of the magnet 30 is such that the magnetic assembly 3 has faces which are substantially straight. The height of the magnets 30 is substantially identical to the height of the loops of the S.

Figure 9:
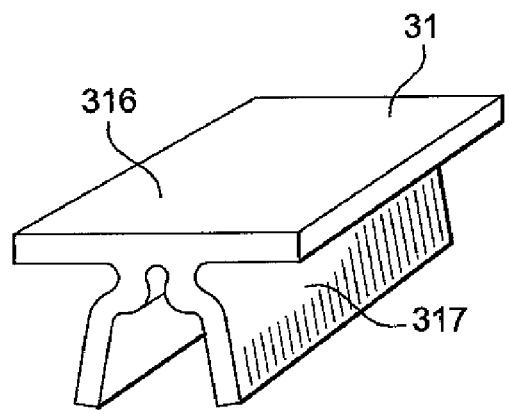
FIG. 9 is a perspective view of a fourth version of the magnetic assembly.
Figure 10:
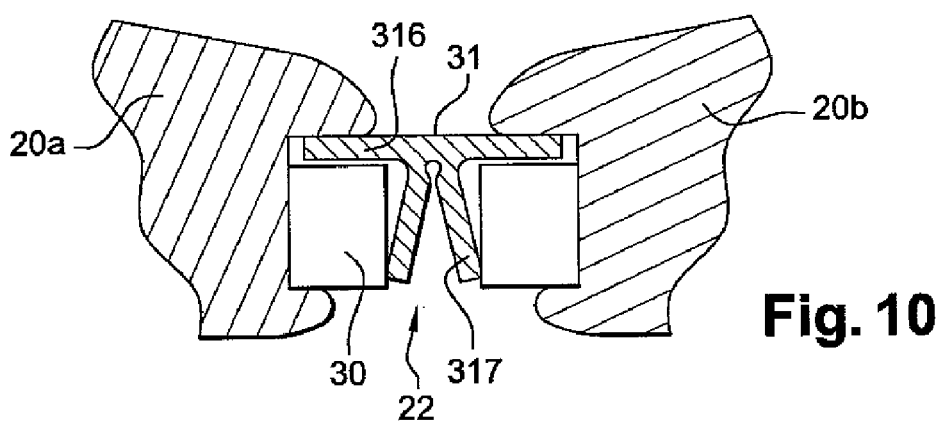
FIG. 10 is a view in section of the magnetic assembly which includes the magnetic member shown in FIG. 9, when fitted.

In a fourth embodiment, which can be seen in FIGS. 9 and 10, the magnetic member 31 has a π-shaped outline. The top part 316 of the 7 is connected to the two legs 317 of the π in such a way that the two legs 317 have a certain amount of lateral elasticity. On each side of the π, which side faces a claw pole 20 of one of the pole wheels 2, is positioned a magnet 30 which is held flat against the relevant claw pole 20 by the spring action of one of the two legs 317. The length of each magnet 30 is substantially equal to the length of the magnetic member 31 which is shaped to have a π-shaped outline.

Figure 11:
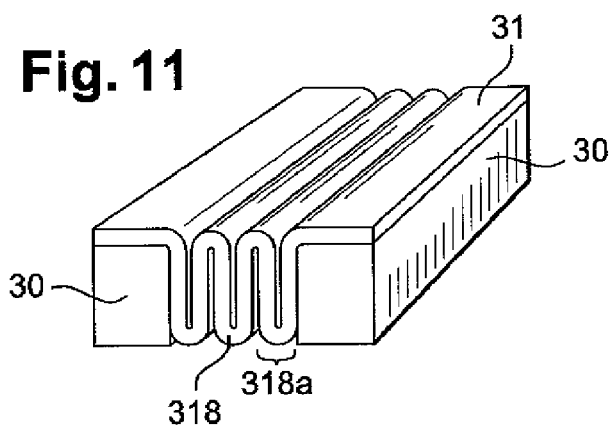
FIG. 11 is a perspective view of a fifth version of the magnetic assembly.

The fifth embodiment, which is shown in FIG. 11, has a partly accordion-like magnetic member 31 with two magnets 30 situated on either side of the accordion-like part 318. The magnetic member 31 is produced from a sheet material which is folded a plurality of times and whose thickness may for example be 0.5 mm. The accordion-like part 318 may have one or more folds 318a. These folds 318a give the magnetic member 31 a certain flexibility which gives it a certain elasticity which enables deformations of the claw poles 20 due in particular to manufacturing tolerances to be absorbed. The elasticity of the folds 318a makes it easier for the magnets 30 to be positioned in the grooves 21 in the claw poles 20.

Figure 12:
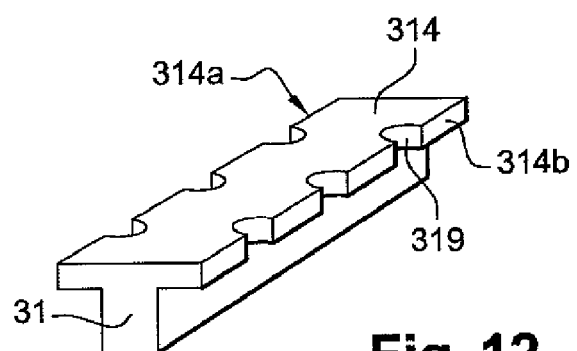
FIG. 12 is a perspective view of a particular variant of the magnetic assembly.

FIG. 12 shows a variant in which the edges 314a and 314b of the top part 314 of the magnetic member 31 are perforated at 319 to assist the flow of the varnish between the claw poles 20 and the magnetic member 31. This variant may be applied to all the shapes of magnetic member 31 which have straight edges.

Figure 13:
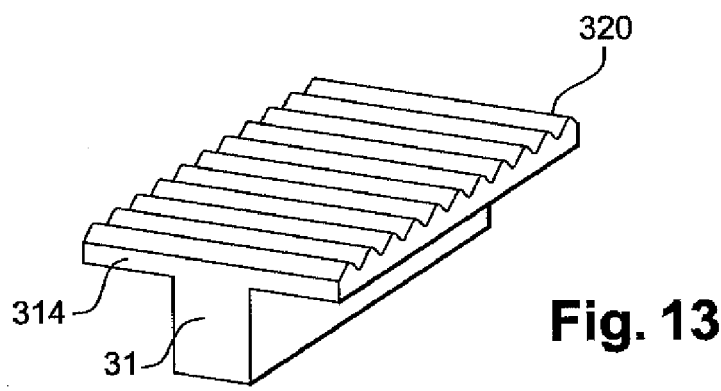
FIG. 13 is a perspective view of another variant of the magnetic assembly.

The part 31 shown in FIG. 13 has serrations 320 on the top of its top part 314. Such serrations may be applied to all the shapes of magnetic member 31 which have a flat upper surface and may also be combined with the perforations 319 of the previous variant.

Figure 14:
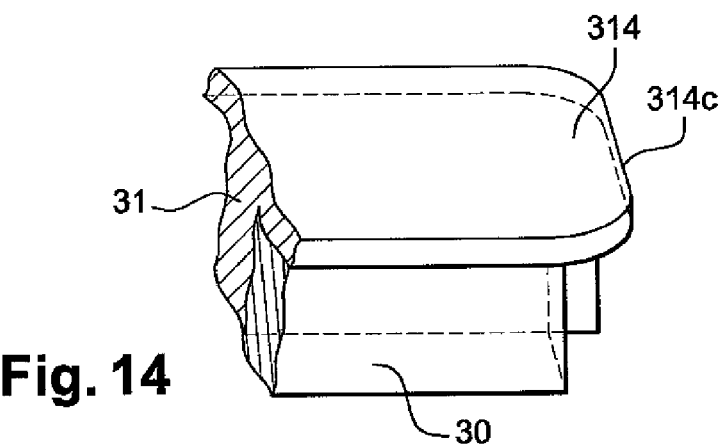
FIG. 14 is a perspective view of a particular embodiment of the magnetic assembly.

The fitting of the assembly 3 into the grooves 21 may be facilitated by rounding one of the ends 314c of the top part 314 of the magnetic member 31 (see FIG. 14). If the magnetic member 31 also has a bottom part, this bottom part may be rounded in the same way. This rounding may be effected whatever the shape of the magnetic member 31 and it may possibly be necessary for the magnet 30 to be rounded. In this way, the insertion of the assemblies 3 may be performed as an automated procedure. The ends 314c may be bevelled rather than rounded.

There will now be described the fitting of the assemblies 3 into the interpole zones 22 of the claw poles 20 of the alternator or alternator-starter. Machining of the claw poles 20 is performed in the interpole zone 22 using a conventional milling cutter to produce a groove 21 on either side of the interpole zone 22.

The fitting together of the assembly 3 may be performed by magnetising the magnet or magnets 30 to the magnetic member 31, or by adhesive bonding them, or again the magnet or magnets 30 are fitted to the magnetic member 31 when unmagnetised, to form the assembly 3 which is possibly then magnetised. This latter solution has the advantage that the magnetic members 30 which are handled during the assembly operation are unmagnetised and the constraints relating to magnetised materials no longer exist. The assembly 3 is then inserted between the grooves 21. This insertion is easier to perform automatically if one of the ends 314 of the assembly 3 is rounded or bevelled.

The invention claimed is:

1. A rotor (1) for a rotary electrical machine, comprising:
two pole wheels (2) each comprising a series of axial claw poles (20) of a trapezoidal overall shape which extend axially from an extreme radial outer edge of each of the pole wheel (2a) towards the other pole wheel (2b), such that each claw pole (20a, 20b) of the pole wheel (2a, 2b) is situated in a space defined between two consecutive claw poles (20a, 20b) of the other pole wheel (2b, 2a); and
a magnetic assembly (3) disposed in at least one interpole space (22);
the magnetic assembly (3) including at least one member (31) made of a magnetic material and at least two magnets (30), such that part of the magnetic assembly being received in a groove (21) made in each of facing edge faces of the two adjacent claw poles (20a, 20b);
the at least one member ant the at least two magnets placed together in at least one interpole space such that the at least two magnets being distributed symmetrically in the at least one interpole space.

2. The rotor according to claim 1, wherein the width of each of the at least two magnets (30) is between 18 and 22 times the size of an air gap.

3. The rotor according to claim 2, wherein the width of each of the at least two magnets (30) is 20 times the size of the air gap.

4. The rotor according to claim 1, wherein the material of the magnetic member (31) is steel.

5. The rotor according to claim 1 wherein each of the at least two magnets (30) is made of rare earth material.

6. The rotor according to claim 1, wherein each of the at least two magnets (30) is positioned against one of the claw poles (20a, 20b).

7. The rotor according to claim 1, wherein the magnetic member (31) has a T-shaped outline.

8. The rotor according to claim 1, wherein the magnetic member (31) has a U-shaped outline.

9. The rotor according to claim 1, wherein the magnetic member (31) has an S-shaped outline.

10. The rotor according to claim 1, wherein the magnetic member (31) has a π-shaped outline.

11. A rotor for a rotary electrical machine according to claim 1, wherein the magnetic member (31) has an H-shaped outline.

12. A rotor for a rotary electrical machine according to claim 1, wherein the magnetic member (31) is produced from sheet material folded into an accordion shape.

13. The rotor for the rotary electrical machine according to claim 1, wherein the magnetic member (31) has lateral perforations (319).

14. The rotor for a rotary electrical machine according to claim 1, wherein the upper surface (314, 315a, 316) of the magnetic assembly (3) is serrated.

15. The rotor for a rotary electrical machine according to claim 1, wherein one of the ends of the upper surface (314, 315a, 316) of the magnetic assembly (3) has at least two rounded edges.

16. An alternator comprising a rotor according to claim 1.

17. An alternator-starter comprising a rotor according to claim 1.

* * * * *